Jan. 14, 1969
R. R. RIMMEY
3,421,780
HITCHING DEVICE
Filed July 14, 1966
Sheet 1 of 2
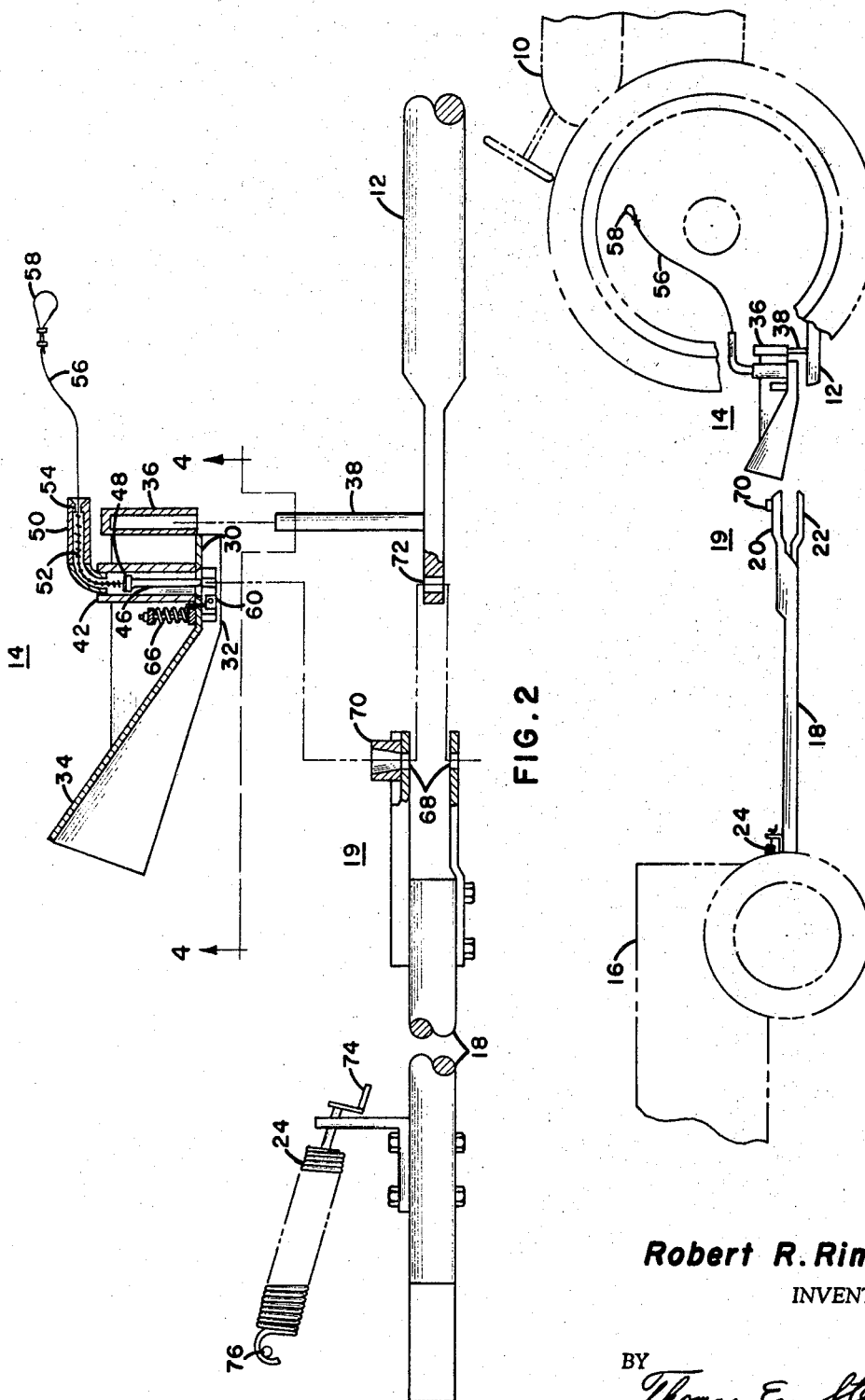
Robert R. Rimmey
INVENTOR.
BY Thomas E. Sterling
ATTORNEY

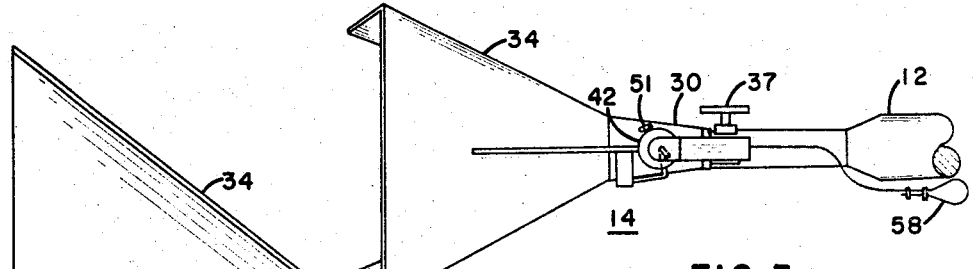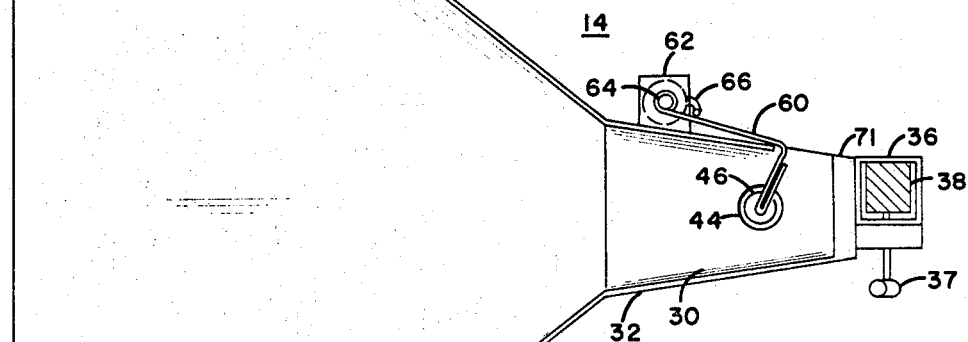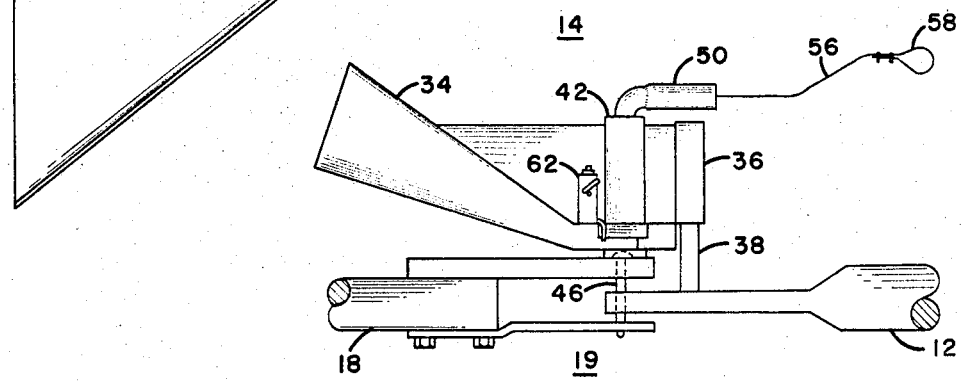

United States Patent Office 3,421,780
Patented Jan. 14, 1969

3,421,780
HITCHING DEVICE
Robert R. Rimmey, R.D., Centre Hall, Pa. 16828
Filed July 14, 1966, Ser. No. 565,159
U.S. Cl. 280—508                                    9 Claims
Int. Cl. B60d 1/02; B60d 1/12

ABSTRACT OF THE DISCLOSURE

This invention sets forth a new and novel device for coupling and releasing farm vehicles from a tractor or other prime moving device. Essentially the coupling device is comprised of a dual prong hitching arm having holes through each of the prongs, which is attached to a wagon or other implement to be drawn. An automatic coupler is attached to the tractor or drawing implement having a coupling hole therein, and is comprised of in general of an outwardly flaring funnel shape guide member which directs the dual pronged arm into a spring loaded pin member which is tripped by a trigger member allowing the spring loaded pin to be driven through the holes in said dual prongs and through the coupling hole, thus coupling the dual prongs to the tractor. A retracting cable member is attached to the spring loaded member allowing a spring loaded pin to be withdrawn to decoupling the device. A stopping device attached to the automatic coupler stops the movement of the dual prongs when the spring loaded pin member and holes in the dual prongs, are aligned.

---

This invention relates to coupling devices to be used for attaching and detaching vehicles from one another. Although the device may be used on most any vehicle, its principal use is found on farm equipment, such as balers, harvesters, choppers, corn pickers, etc. in situations where it is necessary to attach and detach a prime moving vehicle, such as a tractor to a vehicle to be pulled.

Frequently in the operation of powered farm vehicles it is necessary for a prime mover, such as a tractor, to couple onto a vehicle to be pulled, such as a baler, and then after use for the vehicle to be decoupled. This process usually involves the tractor operator backing the tractor to a position near the wagon tongue or pulling bar of the vehicle to be pulled, getting out, coupling the pull bar to the tractor, remounting the tractor and driving away. Decoupling involves the reverse of these procedures. Such methods are time consuming and difficult particularly if the vehicle to be pulled is heavy and it is necessary to jockey the tractor into position for the coupling. The present invention provides a means whereby the tractor may be backed up and automatically coupled onto the wagon tongue of the vehicle to be pulled and immediately driven away. Recoupling is accomplished by merely pulling a release cable causing the tractor to be immediately released from the vehicle to be pulled.

It is therefore an objeect of this invention to provide a quick attaching and detaching hitch for vehicles.

It is another object of this invention to provide an automatic hitching device whereby vehicles may be quickly coupled and decoupled from one another.

It is still another object of this invention to provide a hitch using a double pronged hitching mechanism.

It is yet another object of this invention to provide a hitching device not having exposed operating parts which will collect dirt and forage during operation.

It is yet another object of this invention to provide a compact hitching device which may be readily mounted under a bale thrower.

It is still another object of this invention to provide a hitching device of simple design and easy construction.

It is still another object of this invention to provide a hitch which does not have the main pulling strain placed upon it.

It is yet another object of this invention to provide a hitching device for farm implements which has a double tongue arrangement locked to another double tongue arrangement.

It is still another object of this invention to provide a hitching device having an upstanding member of one of the tongues engaging a guide of the other tongue.

It is still another object of this invention to provide a hitching device for farm implements, capable of being released by a cable pulled at a remote point.

These and other objects of this invention and a fuller understanding may be had by referring to the following description and claims, taken in conjunction with the accompanying drawings in which:

FIGURE 1 shows a side view where the invention is applied to a tongue of a farm wagon and to the rear of a farm tractor;

FIGURE 2 is an exploded side view of the invention, shown in FIGURE 1, partially in section;

FIGURE 3 is a top view of the automatic coupler portion of the invention, shown in FIGURES 1 and 2;

FIGURE 4 is a bottom view of the invention taken along line 4—4 of FIGURE 2; and FIGURE 5 is a side view of the invention partially in section showing the invention in its coupled position.

With reference to the drawings and in particular to FIGURE 1, 10 represents a tractor having an implement hitch 12 attached to the rear portion thereof upon which is mounted the automatic coupler 14 of this invention. A wagon 16, positioned behind the tractor 10, has a wagon tongue 18 extending from the forward portion thereof, on the end portion of which is positioned a clevis hitch device 19, comprised of an upper hitching plate 20 and lower hitching plate 22. Hitching plates 20 and 22 are adapted to be coupled onto automatic coupler 14. Wagon tongue 18 is supported above the ground by adjustable spring 24 attached to the wagon tongue 18 and also to the wagon 16.

Referring now to FIGURES 2 and 3, automatic coupler 14 is comprised of central plate 30 having downwardly disposed flanges 32 on the lateral portion thereof. A funnel shaped tongue guide 34 is integrally attached to the rear portion of central plate 30 so as to flare in a rearward direction, and a square and hollow mounting housing 36 is vertically positioned and integrally attached to the forward portion of central plate 30. A lock screw 37 extends through and is screwably engaged to the lateral portion of the mounting housing 36 so that rotation of lock screw 37 will cause lock screw 37 to advance within or retreat from the interior of mounting housing 36. A square mounting bar 38 is welded in a vertical position upon the implement hitch 12 and supported thereon by an angle bracket 40 welded upon implement hitch 12 and mounting bar 38. Mounting bar 38 is adapted to fit within housing 36 and supports automatic coupler 14. When so positioned lock screw 37 may be tightened against mounting bar 38 so as to securely lock it within mounting housing 36.

A hollow pin housing 42 is vertically welded to the upper portion of central plate 30 directly above a downwardly flaring conical pin aperture 44 in central plate 30. A pin 46 having an upwardly flaring conical pin head is vertically positioned within pin housing 42. J-shaped tubular spring guide 50 is rotatably attached to the top portion of pin housing 42 so that it may be rotated about the top portion of pin housing 42 in any direction. Spring guide locking screw 51 extends through the upper portion of pin housing 42 so as to impinge upon the spring guide 50 to lock it securely in any position desired. The interior of spring guide 50 is in communication with the interior of pin housing 42 so that a compression pin spring 52 extends through the internal portion of spring guide 50 into the internal portion of pin housing 42 to rest upon the top of pin head 48. Pin retainers 54 project from the internal end portion of spring guide 50 most distant from pin housing 42 so as to contain pin spring 52 within pin housing 42. A pin retracting cable 56 is integrally attached to the top portion of pin head 48, extends through pin spring 52, pin retainers 54 to a pin retracting handle 58. Thus as may be seen, when pin retracting handle 58 is pulled, pin 46 is drawn within pin housing 42 against the bias of pin spring 52. When pin retracting handle 58 is released, pin spring 52 forces pin 46 downwardly and outwardly through pin aperture 44.

Referring now to FIGURE 4, an L-shaped pin stop 60 is pivotally attached to pin stop support 62 which is welded to the top of and extends beyond central plate 30. Pin stop 60 rotates about pin stop pivot 64 which extends from the bottom portion of pin stop support 62 vertically upward. A pin stop spring 66 is positioned about pin stop pivot 64 so as to apply lateral pressure against pin stop 60 biasing it to pivot directly under pin aperture 44. In this position pin stop 60 is bearing against and supported by a portion of flange 32. Thus as may be seen when pin 46 is fully retracted within pin housing 42, it will extend through pin aperture 44 and bear against the end portion of pin stop 60 which will retain pin 46 within the pin housing 42. If however pin stop 60 is pivoted about pin stop pivot 64 so as to move from under pin aperture 44, pin 46, driven by pin spring 52 will be forced through pin aperture 44.

Referring now to FIGURES 1, 2 and 5 and to clevis hitching device 19, upper hitching plate 20 is positioned on the upper portion of wagon tongue 18 so as to extend beyond the end portion of wagon tongue 18 and lower hitching plate 22 is positioned on the lower portion of wagon tongue 18 extending outwardly therefrom below upper hitching plate 20. Two aligned pin holes 68 extend through both upper hitching plate 20 and lower hitching plate 22 and are of a sufficient diameter to allow pin 46 to pass through them. A hollow pin guide 70 having an upwardly flaring conical hole therethrough is positioned directly above pin holes 68 and integrally attached to upper hitching plate 20. When upper and lower hitching plates 20 and 22 are pressed under central plate 30 so as to align pin aperture 44 with pin holes 68, the pin guide 70 abuts a vertically positioned stop bar 71 welded on the lower portion of central plate 30. Stop bar 71 prevents further forward movement of the pin guide 70. While in this position, implement hitch 12 extends between the upper and lower hitching plates 20 and 22. Implement hitch 12 contains a coupling hole 72 therethrough which is aligned with pin holes 68 while the clevis hitching device 19 is in this position.

Referring now to FIGURES 2 and 5, when the device is in this position, pin stop 60 has been rotated from directly under pin aperture 44. This allows the pin 46 to be driven through aperture 44 and so that the pin head 48 rests on central plate 30. Pin guide 70 and pin 46 extend through pin holes 68 and coupling hole 72, as may be seen in FIGURE 5. Thus the implement hitch 12 is rotatably coupled to upper and lower hitching plates 20 and 22 and wagon 16 may be drawn by tractor 10.

Referring now to FIGURE 2, adjustable spring 24 is secured to the lower portion of wagon 16 by means of a pin hitch 76 which is secured to wagon 16. Spring handle 74 extends through adjustable spring 24 and is rotatably attached to an L-shaped spring support bracket 78 which is bolted to wagon tongue 18. The turning of spring handle 74 will cause wagon tongue 18 to be elevated or lowered against the bias of spring 24. Thus wagon tongue 18 may be elevated to the approximate height of tongue guide 34.

In operation, wagon tongue 18 is elevated by means of spring handle 74 so that it is approximately the height of tongue guide 34. When it is desired to hitch tractor 10 to the wagon 16, the tractor 10 is backed up until the outwardly flaring tongue guide 34 engages pin guide 70. Further backing of the tractor will cause tongue guide 34 to direct pin guide 70 and the attached upper and lower hitching plates 20 and 22 into the lower portion of central plate 30 where pin guide 70 is retained laterally by flanges 32. When pin guide 70 strikes pin stop 60 it forces pin stop 60 to pivot out of the way, thus releasing spring loaded pin 46 and allowing it to pass through pin aperture 44, pin guide 70, pin holes 68 and coupling hole 72. The pin head 48 will then rest on upper hitching plate 20 within pin guide 70. As may be seen, with the pin 46 in this position tractor 10 may be driven away drawing wagon 16 behind it. The total strain will be borne by upper and lower hitching plates 20 and 22 and implement hitch 12. Little or no strain will be applied to the automatic coupler 14.

When it is desired to unhitch the wagon 16 from the tractor 10, the tractor 10 is stopped and handle 58 pulled thus pulling pin 46 into pin housing 42 against the bias of pin spring 52. When the lower end portion of pin 46 is withdrawn into pin housing 42, and implement hitch 12 withdrawn from coupling hole 72, pin stop 60 will be forced directly under pin aperture 44 by pin stop springs 66. The tractor 10 may be then driven away allowing upper and lower hitching plates 20 and 22 to slip out of contact with automatic coupler 14. Handle 58 is then released allowing the lower portion of pin 46 to again bear against pin stop 60 and maintain it in place.

It may be noted that automatic coupler 14 may be removed from implement hitch 12 by loosening lock screw 37 and lifting it from square mounting bar 38. Automatic coupler is then interchangeable and may be placed on any type of implement having a square mounting bar thereon, giving the device a great degree of versatility. Furthermore because of its simple, compact and rugged design, the device will withstand rugged use and is easily repairable.

Although this invention has been described with a certain degree of particularity, it is understood that the present disclosure has been made only by way of example and that numerous changes in detail and construction of the combination and arrangement of parts may be resorted to without departing from the spirit and scope of the invention. It is hereinafter claimed.

What is claimed is:

1. A coupling device adapted to couple and decouple a first vehicle having a coupling hole positioned thereon, and a second vehicle, said coupling device adapted to permit both vertical and horizontal movement of said first vehicle relative to said second vehicle, comprised of in combination:

a multi-pronged hitching device having attachment holes extending through each of said prongs; said hitching device connected to said second vehicle;

a support member, said support member attached to said first vehicle;

a spring loaded pin member integrally attached to said support member said first vehicle being coupled to said second vehicle solely by said spring loaded pin member positioned through said attachment holes and through said coupling hole;

a trigger member attached to said support member so as to bear against said spring loaded pin member;

a retracting cable member integrally attached to said spring loaded pin member adapted to withdraw said spring loaded pin member;

a guide member integrally attached to said support member adapted to guide said hitching device into contact with said trigger member;

a stopping device integrally attached to said support member adapted to stop movement of said hitching device when said coupling hole, said spring loaded pin member and said attachment holes are aligned.

2. The combination as claimed in claim 1 in which said hitching device is comprised of two prongs.

3. The combination as claimed in claim 2 in which said spring loaded pin member is comprised of in combination:
   a pin housing;
   a pin spring within said pin housing;
   a pin within said pin housing urged by said pin spring toward said coupling hole said pin being unattached to said pin housing while said first vehicle is coupled to said second vehicle.

4. The combination as claimed in claim 3 in which said trigger device is comprised of in combination:
   a pin stop member rotatably attached to said support member;
   a pin stop spring attached to said pin stop member and adapted to bias said pin stop member to bear against said pin;
   whereby said pin is restrained within said pin housing by said pin stop member.

5. The combination as claimed in claim 4 in which said guide member is comprised of a funnel shaped member so as to flare rearwardly from said first vehicle.

6. A coupling device adapted to couple and de-couple a first vehicle having a coupling hole positioned thereon, and a second vehicle, comprised of in combination:
   a two-pronged hitching device having attachment extending through each of said prongs, said hitching device connected to said second vehicle;
   a support member removeably attached to said first vehicle, said support member being comprised of in combination;
      a hollow support housing integrally attached to said support members;
      a mounting bar integrally attached to said first vehicle and adapted to fit within said hollow support housing; and
      securing means adapted to clamp said mounting bar within said hollow support housing;
   a spring loaded pin member integrally attached to said support member, said spring loaded pin member comprised of in combination:
      a pin house;
      a pin spring within said pin housing;
      a pin within said pin housing urged by said pin spring towards said coupling hole;
   a trigger member attached to said support member so as to bear against said spring loaded pin member, said trigger member comprised of, in combination:
      a pin stop member rotatably attached to said support member;
      a pin stop spring attached to said pin stop member and adapted to bias said pin stop member to bear against said pin;
   whereby said pin is restrained within said pin housing by said pin stop member;
   a retracting cable member integrally attached to said spring loaded pin member adapted to withdraw said spring loaded pin member;
   a guide member integrally attached to said support member adapted to guide said hitching device into contact with said trigger member, said guide member comprised of a funnel shaped member so as to flare rearwardly from said first vehicle.

7. The combination as claimed in claim 6 in which said hitching device is supported at the approximate height of said guide member by a support spring attached to said second vehicle; and
   spring adjustment means connected between said support spring and said hitching device;
   whereby the height of said hitching device may be varied by adjusting said spring adjustment means.

8. The combination as claimed in claim 7, having a spring guide member rotatably attached to said pin housing, said spring guide containing said pin spring and having said retracting cable crossing therethrough;
   securing means positioned on said spring guide to securely clamp said spring guide to said pin housing in any position of rotation;
   whereby said retracting cable may be made to face any direction of rotation.

9. The combination as claimed in claim 8 in which said hitching device has positioned thereon a pin guide member adapted to engage said guide member and to direct said hitching device into alignment with said spring loaded pin member.

References Cited

UNITED STATES PATENTS

| | | | |
|---|---|---|---|
| 2,476,511 | 7/1949 | Ruth | 280—515 |
| 2,525,471 | 10/1950 | Balzer | 280—515 X |
| 2,844,390 | 7/1958 | Smith | 280—508 X |
| 3,151,885 | 10/1964 | Johnson | 280—508 X |
| 3,161,422 | 12/1964 | Wade | 280—508 |

FOREIGN PATENTS 589,601 12/1933 Germany.

LEO FRIAGLIA, *Primary Examiner.*

U.S. Cl. X.R.

280—477, 515